United States Patent [19]

Uda

[11] 4,119,878

[45] Oct. 10, 1978

[54] SPARK GAP DEVICE FOR A CATHODE RAY TUBE SOCKET

[75] Inventor: Masayuki Uda, Osaka, Japan

[73] Assignee: Hoshidenki-Seizo Kabushiki Kaisha, Osaka, Japan

[21] Appl. No.: 805,481

[22] Filed: Jun. 10, 1977

[30] Foreign Application Priority Data

Jun. 18, 1976 [JP] Japan ............................ 51/80043[U]

[51] Int. Cl.[2] .......................... H01T 3/00; H02H 9/06

[52] U.S. Cl. .................................... 313/325; 361/129; 313/51

[58] Field of Search ................ 361/119, 129; 313/325, 313/51, 318

[56] References Cited

U.S. PATENT DOCUMENTS

| | | | |
|---|---|---|---|
| 3,251,016 | 5/1966 | Manetti et al. | 313/51 X |
| 3,636,412 | 1/1972 | Simovits et al. | 361/119 |

*Primary Examiner*—Alfred E. Smith
*Assistant Examiner*—Charles F. Roberts
*Attorney, Agent, or Firm*—Pollock, Vande Sande and Priddy

[57] ABSTRACT

One of a pair of electrodes forming a spark gap is connected to a flexible coupling link and the other is extended to form an electrode terminal pin. A molding piece for fixing the spark gap is mounted by molding on at least one pair of electrodes. A common terminal is formed as a unitary structure with the coupling link. The couplıng link is bent to conform to a cathode ray tube socket and incorporated therein.

6 Claims, 11 Drawing Figures

SPARK GAP DEVICE FOR A CATHODE RAY TUBE SOCKET

BACKGROUND OF THE INVENTION

This invention relates to a spark gap device which is adapted so that when an overvoltage above a predetermined value is applied to a contact of a cathode ray tube socket, it is dissipated to ground to protect circuits connected to the socket from the overvoltage.

A cathode ray tube socket having this kind of spark gap device is disclosed, for example, in U.S. Pat. No. 3,251,016. In this patent, one conductor ring is incorporated in a certain spaced relation to a plurality of contacts housed in a socket and spark gaps are formed between the conductor ring and the contacts. In this conventional spark gap device, during assembling of the socket, there is the likelihood that the spacing between the contacts and the conductor ring changes to cause variations in the spark gaps, resulting in the defect of inaccurate protecting operation. Especially when the cathode ray tube sockets of this kind are mass-produced, variations in part accuracy and assembling state are liable to lead to variations in the spark gaps, so that a spark gap device with high accuracy cannot be mass-produced.

For example, in a cathode ray tube socket disclosed in Simovits et al U.S. Pat. No. 3,636,412, issued January 18, 1972, for "Tube Socket Assembly" a pattern for forming spark gaps is obtained by punching a piece of sheet metal and fixing it to an insulating substrate forming one part of the body of the socket, and then cutting or punching at required positions to form the spark gaps. In this case, the spark gaps are higher in accuracy than those in the case of the abovesaid U.S. Pat. No. 3,251,016, but since the spark gaps are formed by cutting or punching after the pattern for the spark gaps is fixed to the insulating substrate and shaped to be housed in the socket, the cutting or punching operation is hard to perform, making it difficult to obtain accurate spark gaps.

An object of this invention is to provide a spark gap device for cathode ray tube sockets which is highly accurate and ensures a protecting operation.

Another object of this invention is to provide a spark gap device for cathode ray tube sockets which is easy to manufacture and assemble and is especially suitable for mass-production.

Still another object of this invention is to provide a spark gap device for cathode ray tube sockets which ensures a protecting operation even in the case of a small socket and is easy to manufacture and assemble.

SUMMARY OF THE INVENTION

According to this invention, a plurality of spark gaps formed with pairs of electrodes and one of the electrodes of each pair is connected as a unitary structure with a common flexible coupling link and a common terminal is formed to extend from the coupling link. An electrode terminal portion to be connected with a contact of a cathode ray tube socket is formed integrally with the other electrode of each spark gap to extend therefrom. The electrodes of the respective pairs are each formed integrally with an individual molding piece and the spark gap defined between the pair of electrodes is retained constant by the molding piece. The abovesaid flexible coupling link is bent and incorporated in the body of the cathode ray tube socket, which is formed of an insulating material, and the contact in the body and the electrode terminal portion corresponding thereto are interconnected. The coupling link is curved about the axis of the cathode ray tube socket and each spark gap and the plate surface of each molding piece are disposed substantially in parallel with the axis of the socket. The electrode has a reinforcing piece formed integrally therewith to extend substantially at right angles to the lengthwise direction of the electrode, and the reinforcing piece is embedded in the molding piece to reinforce coupling of the electrodes with the molding piece. It is also possible to dispose the electrodes and the coupling portion of the link within the molding piece so that the coupling link serves as the reinforcing piece, too.

The spark gap device of this invention is manufactured, for example, in the following manner: Coupling arms are formed to extend between a pair of longer sides of a rectangular frame at proper intervals and some of the coupling arms are cut in the vicinity of one of the longer sides to form spark gaps. The longer side close to the spark gaps is the coupling link and the other longer side is an auxiliary link. The reinforcing piece is formed as a unitary structure with the coupling arm to extend laterally therefrom in the vicinity of the spark gap on the side of the auxiliary link. The coupling link, the auxiliary link, the coupling arms, the spark gaps and the reinforcing pieces can be formed by punching or chemical etching of a flexible sheet metal. The molding piece is attached by molding to surround each spark gap and include the coupling portion with the coupling link and the reinforcing piece within the molding piece. Then, the auxiliary link and unnecessary ones of coupling arms are cut off and the spark gap device is bent to conform to a housing portion in the body of the socket and mounted in the socket.

DESCRIPTION OF THE PREFERRED EMBODIMENTS

Figure 1:
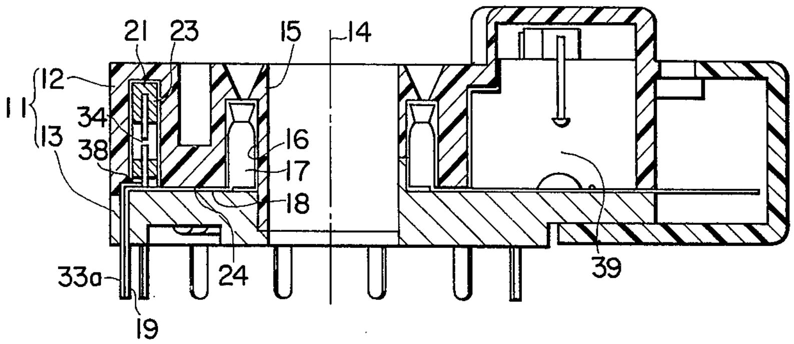
FIG. 1 is a longitudinal-sectional view showing an example of a cathode ray tube socket to which a spark gap device of this invention is applied.

In FIG. 1 reference numeral 11 indicates a body made of an insulating material, which body is shown to consist of a front body 12 and a rear body 13 fixedly attached to the back thereof. The body 11 is thick and disc-shaped in its entirety, and has a central opening 15 disposed therethrough about its axis 14 and a series of contact housing holes 16 formed in the body 11 in its axial direction at equiangular intervals about the axis 14. The contact housing holes 16 each have disposed therein a contact 17. The rear end of the contact 17 is bent in a lateral direction towards the periphery of the body 11 to form an extension 18, the extending end of which is bent backward at the periphery of the body 11 to form a terminal 19. The lateral extension 18 is held between the bodies 12 and 13. On the outside of the array of contacts 17, recesses 21 for spark gaps are formed in the front body 12 about the axis 14 to extend from the back of the body 12 corresponding to desired ones of the contacts 17. A molded piece 23 surrounding the spark gap is disposed in each of the recesses 21.

Figure 2:
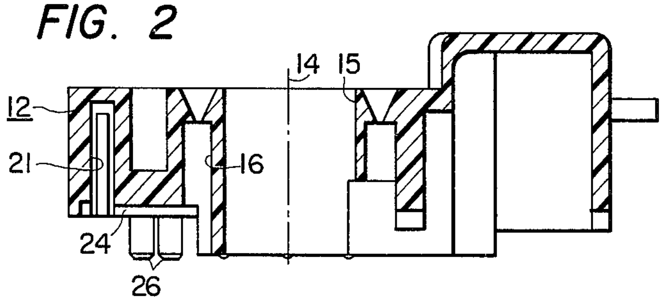
FIG. 2 is a longitudinal-sectional view of a front body used in FIG. 1.
Figure 3:
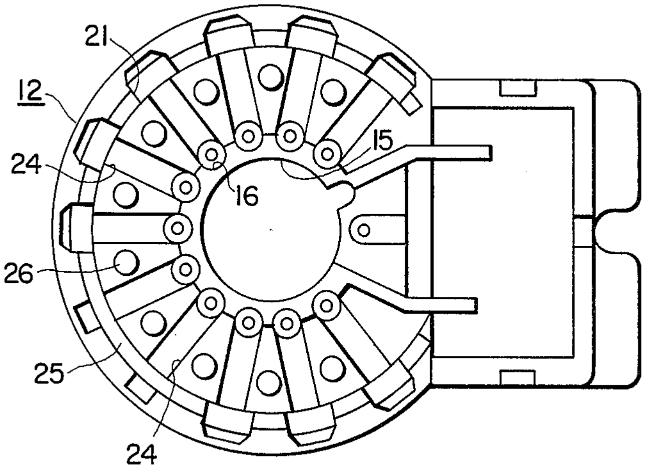
FIG. 3 is its bottom view.

The underside of the front body 12 has formed therein radial grooves 24 which respectively link the contact housing holes 16 and the spark gap recesses 21 corresponding thereto as illustrated in FIGS. 2 and 3. The aforementioned lateral extension 18 of the contact is disposed in the grooves 24. Similar grooves 24 are also formed to extend radially from those contact housing holes 16 which have no recesses corresponding thereto. Further, an annular groove 25 is formed in the front body 12 about the axis 14 to interconnect the recesses 21. On the underside of the front body 12, studs 26 are formed to project downwardly therefrom between adjacent ones of the grooves 24.

Figure 4:
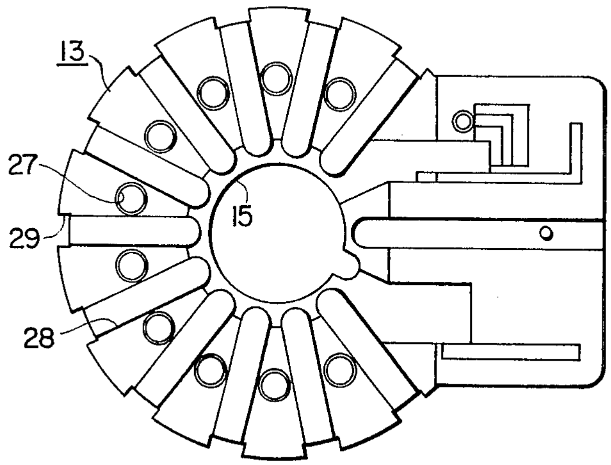
FIG. 4 is a plan view of a rear body used in FIG. 1.
Figure 5:
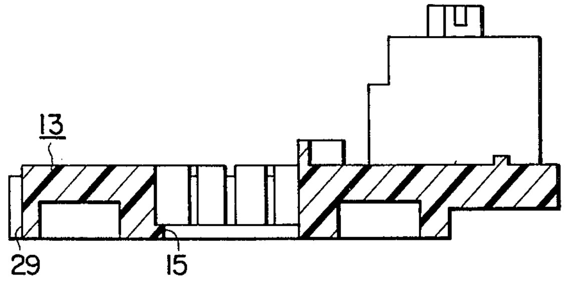
FIG. 5 is its back view.

The rear body 13 has holes 27 disposed therethrough respectively corresponding to the studs 26, as shown in FIGS. 4 and 5, and the studs 26 are respectively inserted into the holes 27 and the projecting ends of the studs 26 are expanded by heating, by which the front and rear bodies 12 and 13 are formed as a unitary structure with each other. Moreover, grooves 28 are formed in the rear body 13 in opposing relation to the grooves 24. The outer end of each of the grooves 24 is contiguous to each groove 29 which extends in the axial direction of the rear body 13 and in which the terminal 19 is positioned. The front and rear bodies 12 and 13 are each formed as a molding of a synthetic resin.

Figure 6:
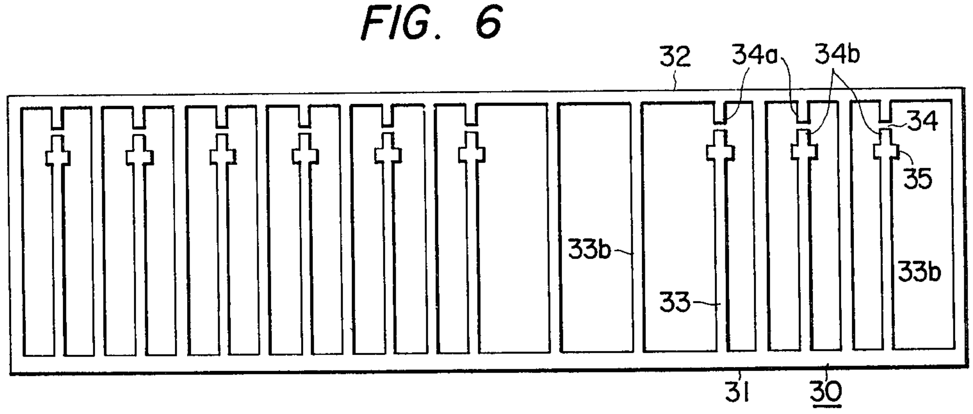
FIGS. 6 to 8 are plan views illustrating steps involved in the manufacture of an example of the spark gap device of this invention.

The spark gap device of this invention is formed in the following manner: As illustrated in FIG. 6, coupling arms 33 are connected between opposing sides 31 and 32 of a frame 30 at suitable intervals in its lengthwise direction. Suitable ones 33*a* of the coupling arms 33 are cut in the vicinity of the side 32 to form spark gaps 34. It is preferred that the spark gaps 34 lie on a straight line parallel with the side 32. The cut parts of each arm 33*a* forming the spark gap 34 serve as electrodes 34*a* and 34*b*. In order to maintain the spark gaps in their configuration, a coupling arm 33*b* which has no spark gap is disposed between every other one or more of coupling arms 33*a*. It is preferred to form a reinforcing piece 35 on the arm 33*a* having the spark gap 34 on the side of the side 31 of the frame 30 near the spark gap 34 in such a manner that the reinforcing piece extends laterally with respect to the electrode 34*b*. The frame 30, the coupling arms 33 and reinforcing piece 35 can be simultaneously formed by press work or etching of a flexible sheet metal. The side 32 of the frame 30 which is close to the spark gap 34 forms a flexible coupling link and the other side 31 serves an an auxiliary link and the arm 33*a* extending between the electrode 34*b* and the auxiliary link 31 is an electrode terminal part.

Figure 7:
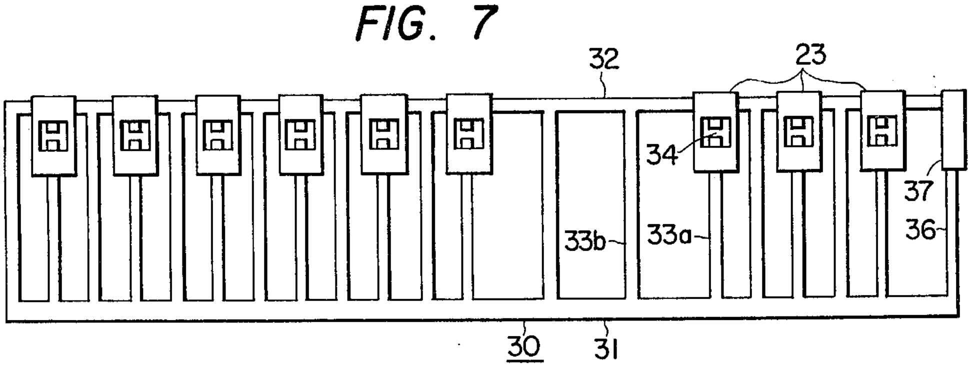

Next, as shown in FIG. 7, a molding piece 23 of a synthetic resinous material for fixing the electrodes 34*a* and 34*b* is attached by molding to the frame 30 in the proximity of each spark gap 34. The molding piece 23 is provided in the form of a frame including the reinforcing piece 35, and the coupling portion of the link 32 and the electrode 34*a*. Simultaneously with the formation of the molding piece 23, a molding piece 37 can be formed at the coupling portion between the coupling arm 33 serving as a common terminal 36 and the coupling link 32.

Figure 8:
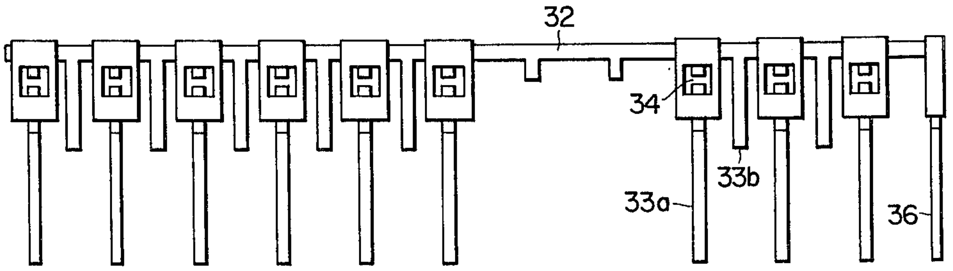
Figure 9:
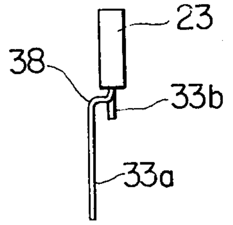
FIG. 9 is a side view of FIG. 8.
Figure 10:
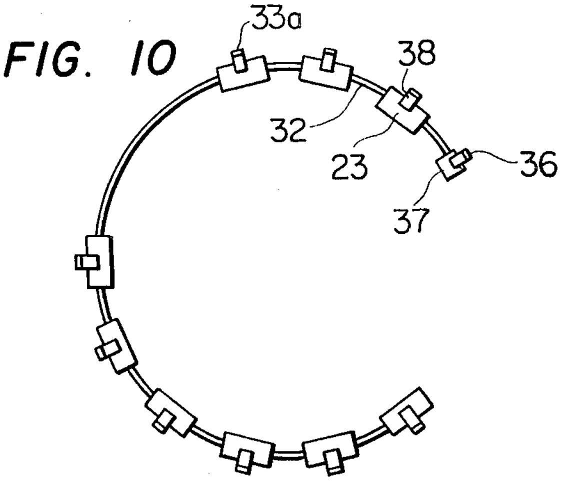
FIG. 10 is a plan view of the spark gap device bent to conform to a cathode ray tube socket.
Figure 11:
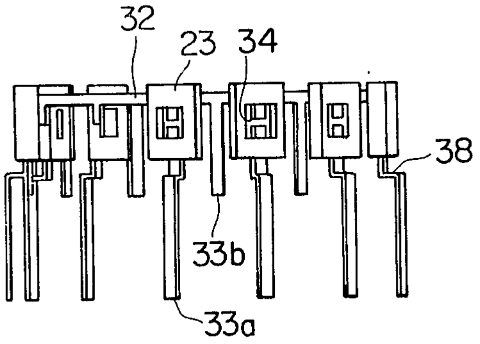
FIG. 11 is a front view of the spark gap device shown in FIG. 10.

Then, as depicted in FIGS. 8 and 9, the side 31 of the frame 30 on the side of which the molding pieces are not formed, that is, the auxiliary link 31, is removed and, at the same time, the arms 33*b* which have no spark gaps 34 are also cut off on the side of the link 31. Further, the coupling arm 33*a* having formed therein the spark gap 34 is bent laterally in the vicinity of the molding piece 23 and then bent in the vertical direction again, forming a receiving portion 38, as shown in FIG. 9. Then, as illustrated in FIGS. 10 and 11, the coupling link 32 is bent in the form of a circular arc about the axis 14 in FIG. 1 and the coupling arms 33*a*, tha is, the electrode terminal pins, are arranged in parallel with the axis 14.

In such a state, the coupling link 32 is inserted in the annular groove 25 of the front body 12, with the molding pieces 23 disposed in the recesses 21. The receiving portion 38 of each electrode terminal pin 33*a* is held between the front and rear bodies 12 and 13 and disposed on the lateral extension 18 of the contact 17 corresponding thereto, and the terminal 19 and the electrode terminal pin 33*a* are interconnected. In this case, the remaining end of each coupling arm 33*b* makes contact with the front of the rear body 13, ensuring that the spark gap device shown in FIGS. 10 and 11 is stably held in the body 11.

In the above, each molding piece 23 holds one spark gap 34 but it is also possible to hold a plurality of adjacent spark gaps 34 with one molding piece 23. Also in this case, the size of the molding piece is limited so that the coupling link may be bent to insert the spark gap device into a socket. Further, where the coupling link 32 is formed of a relatively soft material, it can be bent by hand when the spark gap device is built in the socket even if the coupling link 32 is not previously bent to conform to the socket as shown in FIGS. 10 and 11. Moreover, in the above, the spark gap 34 is formed prior to the formation of the molding piece 24 as depicted in FIG. 6, but may also be formed after the molding piece 23 is attached by molding, as shown in FIG. 7. In FIG. 1, reference numeral 39 indicates a high-voltage spark gap for a high-voltage electrode.

Where an overvoltage above a predetermined value is applied to a contact 17 in the abovessaid structure, the voltage is discharged at the spark gap 34 to which that contact 17 is connected, and grounded through the common terminal 36, thus providing a protecting operation. Since the spark gaps 34 are coupled together through the flexible coupling link 32, it is possible that the spark gap device has different shapes when it is manufactured and when incorporated in the socket. That is, if the spark gap device is flat as shown in FIGS. 6 and 9 during manufacture, it facilitates an operation such as punching or etching, is suitable for mass production and provides the spark edges 34 with high accuracy. When the spark gap device is incorporated in the socket, the coupling link 32 is bent to conform to the insertion recess in the socket. Even if the spark gap device is thus bent, since the spark gaps 34 are mechanically held by the individual molding pieces 23, they are maintained correctly at a predetermined value to perform a discharge operation at a predetermined high voltage, ensuring the desired protecting operation. Accordingly, also in the case of building many spark gaps in a small socket, which is the recent trend in the art, it is possibl to obtain a spark gap device which is easy to manufacture and assemble, suitable for mass production and highly accurate.

Further, in the case of a structure wherein the molding piece is arranged vertically, that is, in parallel with the axis 14, it is possible to increase the width of the part between the opposing electrodes of the spark gap 34 by increasing the length of the molding piece in the peripheral direction with respect to the axis 14. This increases the lifetime of the discharge gap. In this case, the spacing between adjacent ones of the molding pieces 23 increases to provide allowance for the formation of the spark gap, enhancing the insulation effect between the molding pieces.

Where the minimum value of the overvoltage required differs for different ones of the contacts 17, it is sufficient only to change the spacings of the spark gaps for the contacts corresponding thereto. In this case, it is relatively easy to form the spark gap device with the magnitudes of the spark gaps selected different from one another. Since the discharge gaps are previously formed in the state shown in FIG. 6, 7 or 8, that is, before the spark gap device is incorporated in the body, the magnitudes of the discharge gaps can be readily made different from one another. In addition, since the spark gaps 34 are connected together at one end through the coupling link 32, the gaps can be formed with ease. Also, it is easy to change the contacts to be protected depending upon which of the arms 33 has formed therein the spark gap in FIG. 6. Moreover, as will be seen from FIG. 6, since the spark gaps 34 lie on a straight line along the coupling link 32, the spark gaps can be successively formed by punching.

It will be apparent that many modifications and variations may be effected without departing from the scope of novel concepts of this invention.

What is claimed is:

1. A spark gap device for a cathode ray tube socket comprising:

a plurality of spark gap portions, each forming a spark gap between a pair of electrodes disposed close to each other;

a flexible coupling link for coupling one electrode of each spark gap portion;

a common terminal portion formed as a unitary structure with the coupling link;

electrode terminal portions extending from the other electrodes of the spark gap portions and to be connected with contacts of the cathode ray tube socket corresponding to the electrode terminal portions; and a plurality of molding pieces, each formed as as unitary structure with each pair of electrodes to hold the spark gap at a predetermined value;

wherein the coupling link is adapted to be bendable so that the molding pieces may lie at predetermined positions in the cathode ray tube socket when the spark gap portions are incorporated in the cathode ray tube socket.

2. A spark gap device for a cathode ray tube socket according to claim 1, wherein the coupling link is curved in the form of a circular arc so that when the spark gap portions are incorporated in the cathode ray tube socket, the molding pieces of the spark gap portions are inserted in predetermined recesses formed in the cathode ray tube socket, with the surfaces of the molding pieces held substantially parallel with the axis of the cathode ray tube socket.

3. A spark gap device for a cathode ray tube socket according to claim 1, wherein before incorporated in the cathode ray tube socket, the coupling link is straight and the electrode terminal portions extend substantially at right angles to the coupling link and the spark gaps of the spark gap portions are positioned on a straight line substantially parallel with the coupling link.

4. A spark gap device for a cathode ray tube socket according to claim 1, wherein a reinforcing piece is formed integrally with one of each pair of electrodes to extend at right angles to the electrode, thereby reinforcing coupling between the electrode and each molding piece.

5. A spark gap device for a cathode ray tube socket according to claim 4, wherein the coupling portion of the coupling link and the electrode is formed within each moldin piece and the coupling link performs the function of the reinforcing piece, too.

6. A spark gap device for a cathode ray tube socket according to claim 1, wherein each molding piece is frame-shaped to surround the spark gap corresponding thereto.

* * * * *